(12) United States Patent
Yu et al.

(10) Patent No.: US 11,938,525 B2
(45) Date of Patent: Mar. 26, 2024

(54) REACTION KETTLE CLEANING DEVICE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(72) Inventors: Haijun Yu, Guangdong (CN); Aixia Li, Guangdong (CN); Yinghao Xie, Guangdong (CN); Xuemei Zhang, Guangdong (CN); Kang Chen, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/265,893

(22) PCT Filed: Dec. 30, 2021

(86) PCT No.: PCT/CN2021/142948
§ 371 (c)(1),
(2) Date: Jun. 7, 2023

(87) PCT Pub. No.: WO2022/267422
PCT Pub. Date: Dec. 29, 2022

(65) Prior Publication Data
US 2024/0033788 A1 Feb. 1, 2024

(30) Foreign Application Priority Data

Jun. 23, 2021 (CN) .......................... 202110697002.0

(51) Int. Cl.
*B08B 9/08* (2006.01)
*B01J 19/18* (2006.01)
*B08B 9/087* (2006.01)

(52) U.S. Cl.
CPC ............. *B08B 9/0808* (2013.01); *B01J 19/18* (2013.01); *B08B 9/087* (2013.01); *B08B 2209/08* (2013.01)

(58) Field of Classification Search
CPC ......... B08B 9/08; B08B 9/0808; B08B 9/087; B08B 2209/08; B01J 19/18
See application file for complete search history.

(56) References Cited

U.S. PATENT DOCUMENTS 5,779,996 A * 7/1998 Stormo ..................... C02F 3/06
366/170.3

FOREIGN PATENT DOCUMENTS

| CN | 205586603 U | 9/2016 |
|----|-------------|--------|
| CN | 107694502 A | 2/2018 |

(Continued)

OTHER PUBLICATIONS

International Search Report and Written Opinion of the International Search Authority issued by the China National Intellectual Property Administration for International Patent Application No. PCT/CN2021/142948, dated Mar. 25, 2022, with an English translation.

(Continued)

*Primary Examiner* — Randall E Chin
(74) *Attorney, Agent, or Firm* — MYERS WOLIN, LLC

(57) ABSTRACT

A reaction kettle cleaning apparatus, includes a kettle body and a stirrer, the stirrer being located in the kettle body and (Continued)

including a stirring rod and a stirring portion, where a movable frame is disposed on the stirring rod and is movable along the stirring rod; and a cleaning device is disposed on the movable frame is configured to clean the kettle body; and the reaction kettle cleaning apparatus further includes a movable control apparatus configured to control the movable frame to move.

5 Claims, 5 Drawing Sheets

(56) References Cited

FOREIGN PATENT DOCUMENTS

| CN | 206951187 U | | 2/2018 |
|----|-------------|---|--------|
| CN | 209423613 U | | 9/2019 |
| CN | 210253425 U | | 4/2020 |
| CN | 210613691 U | | 5/2020 |
| CN | 112973608 A | * | 6/2021 |
| CN | 113426781 A | | 9/2021 |
| CN | 113426781 B | | 9/2022 |
| JP | 2006-51460 A | | 2/2006 |

OTHER PUBLICATIONS

First Office Action and Search Report issued by the State Intellectual Property Office of People's Republic of China for Chinese Patent Application No. 202110697002.0, dated Mar. 18, 2022, with an English translation.

Notification to Grant Patent Right for Invention issued by The State Intellectual Property Office of People's Republic of China for Chinese Patent Application No. 202110697002.0, dated Jul. 5, 2022, with an English translation.

* cited by examiner

REACTION KETTLE CLEANING DEVICE

CROSS-REFERENCE TO RELATED APPLICATION

This application is a national stage filing under 35 U.S.C. § 371 of international application number PCT/CN2021/142948, filed Dec. 30, 2021, which claims priority to Chinese patent application No. 202110697002.0 filed Jun. 23, 2021. The contents of these applications are incorporated herein by reference in their entirety.

TECHNICAL FIELD

The present disclosure relates to the field of chemical production technologies, and in particular, to a reaction kettle cleaning apparatus.

BACKGROUND

Reaction kettles are widely applied to chemical production. For example, a reaction kettle is usually used as a reaction container in battery recycling. After a reaction kettle is used for a long time, the interior of the reaction kettle needs to be cleaned by special cleaning personnel. However, because a reaction kettle has a relatively small internal space, the cleaning work is relatively dangerous in a limited space, causing particular danger to an operator. In addition, during actual use, different battery powders are replaced for production in a reaction kettle, the reaction kettle needs to be thoroughly cleaned before replacement, and frequent rinsing increases a probability of danger. Therefore, a cleaning apparatus needs to be added to the reaction kettle.

There are many reaction kettle cleaning apparatuses at present. However, it is found in practice that the existing reaction kettle cleaning apparatuses have the following disadvantages: 1. A cleaning brush head cannot be concealed, resulting in complex operations in stirring. 2. Because a cleaning head is exposed in a reaction kettle for a long time, the service life of the cleaning head is reduced, and the cleaning head itself tends to become relatively dirty and lose the function of cleaning. 3. The cleaning head remains inside the reaction kettle, and eventually the material of the cleaning head is prone to corrosion. Some impurities remain during cleaning, and pollution is caused during replacement of product materials with different constituents, which affects the subsequent impurity removal of battery powders, leading to the problem of lower product quality.

SUMMARY

To overcome the deficiencies in the current technology, the present disclosure provides a reaction kettle cleaning apparatus.

A technical solution adopted in the present disclosure to resolve the technical problems thereof is as follows: A reaction kettle cleaning apparatus is provided, including a kettle body and a stirrer, wherein the stirrer is located in the kettle body and includes a stirring rod and a stirring portion; a movable frame is disposed on the stirring rod and is movable along the stirring rod; and a cleaning device is disposed on the movable frame and is configured to clean the kettle body; and further including a movable control apparatus configured to control the movable frame to move.

According to the reaction kettle cleaning apparatus provided in the present disclosure, the movable control apparatus is used to control the movable frame to move along the stirring rod, so as to enable the cleaning device to move to a predetermined cleaning position to perform cleaning when cleaning is required and to retract when cleaning is not required. Thus, the cleaning device does not need to be assembled/dissembled, and the production work is not affected. The apparatus is particularly suitable for operation in a relatively sealed reaction kettle.

According to some preferred embodiments of the present disclosure, the movable frame is provided with a noncircular hole, and the stirring rod includes a noncircular cross-sectional segment.

According to some preferred embodiments of the present disclosure, the stirring rod includes a circular cross-sectional segment.

According to some preferred embodiments of the present disclosure, a sleeve is disposed on the stirring rod and is rotatable relative to the stirring rod.

According to some preferred embodiments of the present disclosure, a telescopic apparatus is disposed between the movable frame and the cleaning device.

According to some preferred embodiments of the present disclosure, the telescopic apparatus is a scissors-type telescopic structure.

According to some preferred embodiments of the present disclosure, a seal ring is disposed between the sleeve and the stirring rod.

According to some preferred embodiments of the present disclosure, the movable control apparatus includes a rope winder and a sling.

According to some preferred embodiments of the present disclosure, the kettle body includes a concealed seal cavity and a stirring cavity.

According to some preferred embodiments of the present disclosure, a seal cavity cover is disposed between the concealed seal cavity and the stirring cavity.

The beneficial effects of the present disclosure are as follows:
1. The new cleaning apparatus adopts a design of using a movable control apparatus to control a movable frame to move along a stirring rod, to implement a concealable cleaning device, so that the cleaning device does not need to be assembled/dissembled, and the production work is not affected.
2. The new cleaning apparatus adopts a design that a noncircular hole in the movable frame cooperates with a noncircular cross-sectional segment of the stirring rod, so that the stirring rod can rotate to drive the cleaning device to rotate without an additional external power for driving the cleaning device.
3. The new cleaning apparatus adopts a design of providing a sleeve, to ensure that during operation, the movable frame and the stirring rod do not rotate relative to each other, to avoid causing wear to the stirring rod or the movable frame.
4. A seal cavity cover cooperates with a cover seal sleeve to provide sealing between a concealed seal cavity and a stirring cavity inside a kettle body, so that a cleaning device is concealed in a sealed space during the operation of a reaction kettle, thus ensuring that the operation of the reaction kettle and the concealment of the cleaning device do not conflict.

BRIEF DESCRIPTION OF DRAWINGS

The present disclosure is further described below with reference to the accompanying drawings and embodiments.

Figure 1:
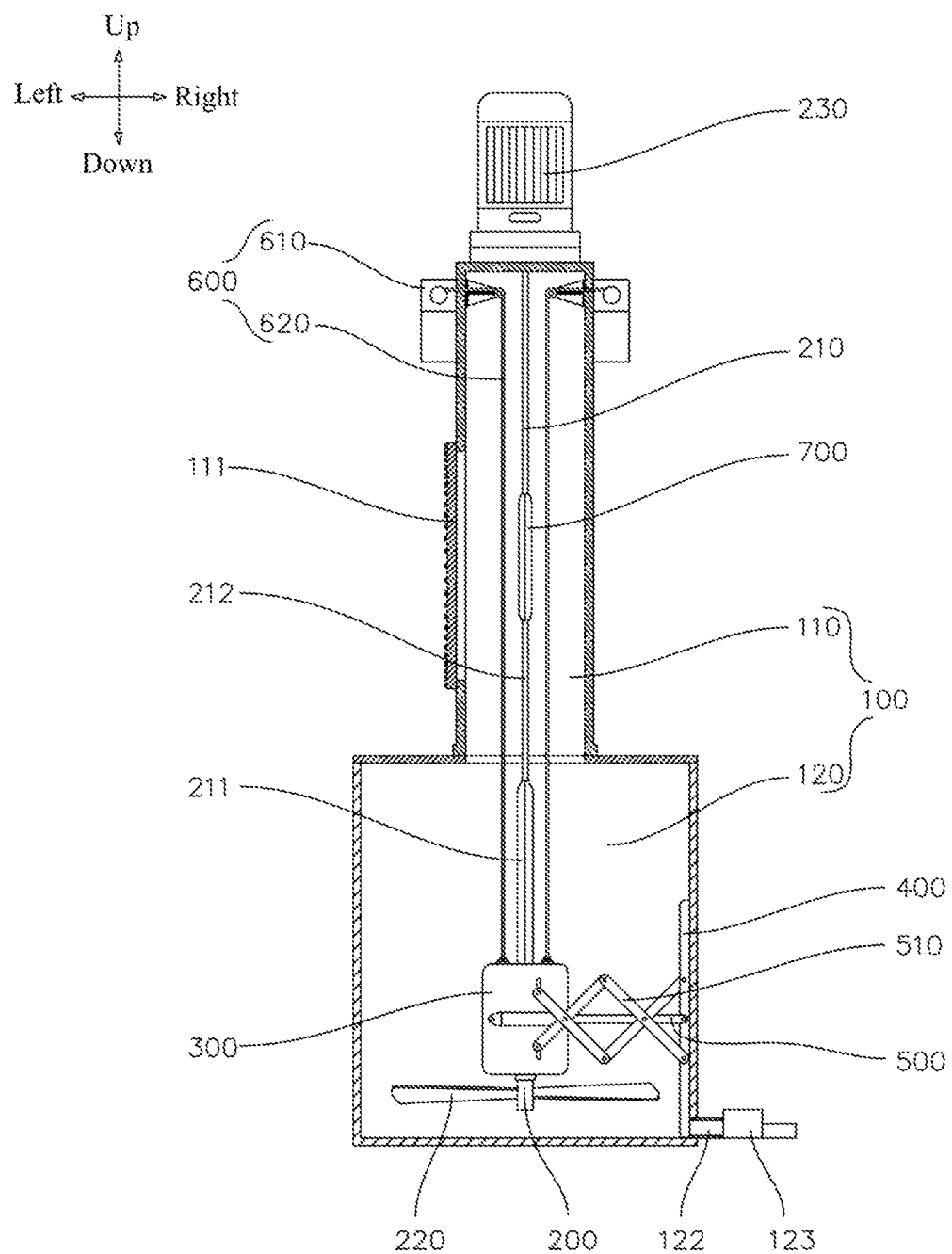
FIG. 1 is a schematic structural diagram of a cleaning device in an operating state according to the present disclosure.

REFERENCE NUMERALS kettle body 100, concealed seal cavity 110, maintenance plate 111, stirring cavity 120, water inlet pipe 121, water discharge pipe 122, and water discharge pump 123; stirrer 200, stirring rod 210, noncircular cross-sectional segment 211, circular cross-sectional segment 212, stirring portion 220, and stirring reducer 230; a movable frame 300, and noncircular hole 310; cleaning device 400; telescopic apparatus 500, and scissors-type telescopic structure 510; movable control apparatus 600, rope winder 610, and sling 620; sleeve 700, seal ring 701, circlip 702, bearing 703, stationary position sleeve 710, cover seal sleeve 720, support sleeve 721, and seal sleeve 722; and seal cavity cover 800, and cover control apparatus 810.

DETAILED DESCRIPTION

To make the objectives, technical solutions, and advantages of this application more comprehensible, the present disclosure is further described below in detail with reference to the accompanying drawings and embodiments. In the following description, some specific details are included to provide a thorough understanding of the present disclosure. The present disclosure may still be practiced without these specific details. These descriptions and representations are used by those skilled in the art to more effectively convey the substance of their work to others skilled in the art.

It should be further noted that the words "left side", "right side", "upper side", "lower side", and the like used in the following description refer to directions in the accompanying drawings. The words "inward" and "outward" respectively refer to the directions toward or away from the geometric center of a specific component. Simple adjustments made by a related person skilled in the art without creative efforts should not be considered as a technology beyond the protection scope of this application.

"First", "second", and the like described herein are used only for distinguishing the technical feature, but are not intended to indicate or imply relative importance or implicitly specify a quantity of indicated technical features or implicitly specify an order of indicated technical features.

It should be understood that the specific embodiments described herein are merely used to describe this application rather than limiting the actual scope of protection. To avoid obscuring the objectives of the present disclosure, technologies such as well-known manufacturing methods, control procedures, component sizes, material constituents, and pipe layouts are already readily comprehensible, and therefore are not described in detail.

FIG. 1 is a schematic structural diagram of an embodiment of a cleaning device in an operating state according to the present disclosure. Referring to FIG. 1, an embodiment of the present disclosure provides a reaction kettle cleaning apparatus, including a kettle body 100 and a stirrer 200. The stirrer 200 is located in the kettle body 100. The stirrer 200 includes a stirring rod 210 and a stirring portion 220. The stirring rod 210 rotates to drive the stirring portion 220. For a specific operation principle, reference may be made to the structure of an existing reaction kettle. Details are not described again herein.

Figure 2:
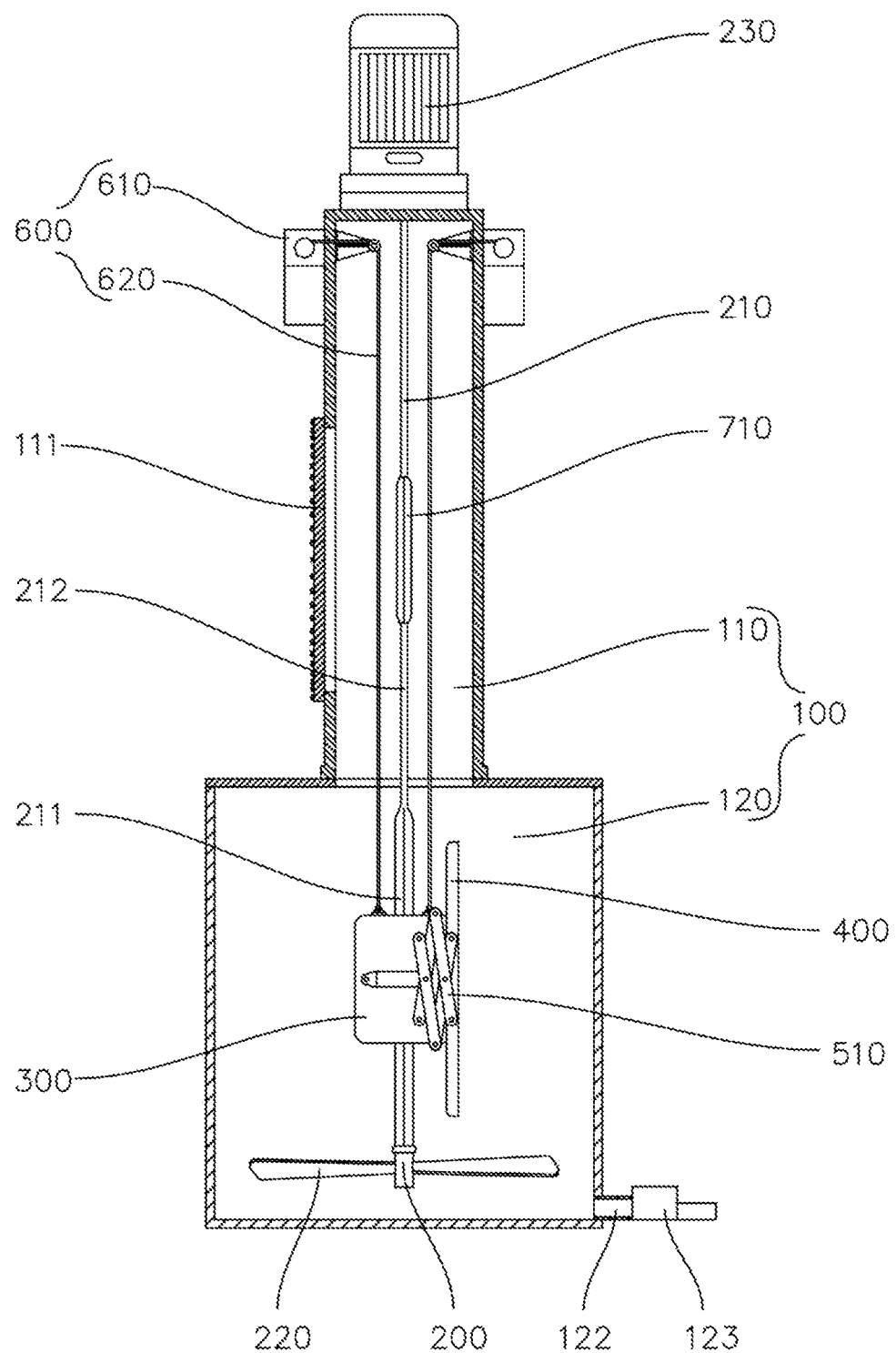
FIG. 2 is a schematic structural diagram of the cleaning device in a retracted state according to the present disclosure.
Figure 3:
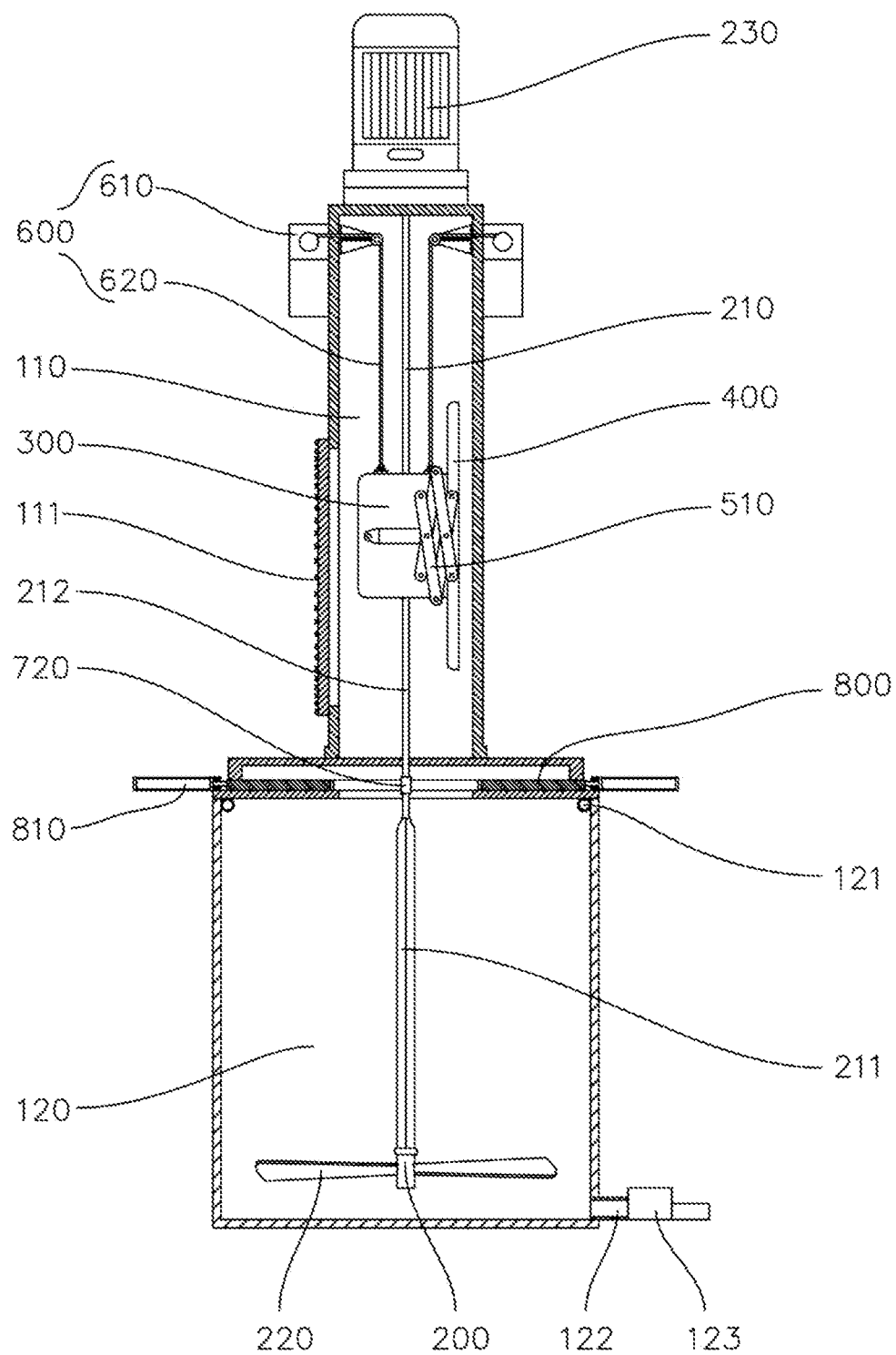
FIG. 3 is a schematic structural diagram of the cleaning device in a concealed state according to the present disclosure.

Referring to FIG. 2 and FIG. 3, furthermore, a movable frame 300 is disposed on the stirring rod 210 and is movable along the stirring rod 210.

Furthermore, a cleaning device 400 is disposed on the movable frame 300 and is configured to clean the kettle body 100.

Furthermore, the reaction kettle cleaning apparatus further includes a movable control apparatus 600 configured to control the movable frame 300 to move.

During actual operation, referring to FIG. 1, when cleaning starts, after the movable control apparatus 600 controls the movable frame 300 to move and drives the cleaning device 400 to move a predetermined cleaning position, the cleaning device 400 cleans an inner wall of the kettle body 100. Referring to FIG. 2 and FIG. 3, after cleaning is completed, the movable control apparatus 600 controls the movable frame 300 to move and drives the cleaning device 400 to a predetermined retraction position to be concealed.

The disclosure of the reaction kettle cleaning apparatus disclosed above is merely a preferred embodiment of the present disclosure and is merely intended for describing the technical solutions of the present disclosure rather than limiting the present disclosure. Persons of ordinary skill in the art should understand that they may still make modifications or additions to the technical solutions recorded in the foregoing technical solution in combination with the current technology or make equivalent replacements to some technical features thereof without departing from the scope of the technical solutions of the embodiments of the present disclosure.

Description is provided below with reference some embodiments. The "an embodiment" referred herein means that a particular feature, structure, or characteristic described in combination with an embodiment can be included in at least one embodiment of this application. The phrases that appear in various places of the description do not necessarily all refer to the same embodiment, nor are they independent or alternative embodiments that are mutually exclusive from other embodiments. In addition, details in one or more embodiments do not indicate any fixed specific order, and do not cause a limitation to the present disclosure.

In some embodiments, the stirring rod 210 extends in a vertical direction, and the stirring portion 220 is located on a lower side of the stirring rod 210.

In some embodiments, the stirring portion 220 may be a stirring leaf, a stirring blade, a stirring screw rod, or another stirring structure.

In some embodiments, the stirring rod 210 is driven by a stirring motor and a stirring reducer 230 on an upper side.

Figure 4:
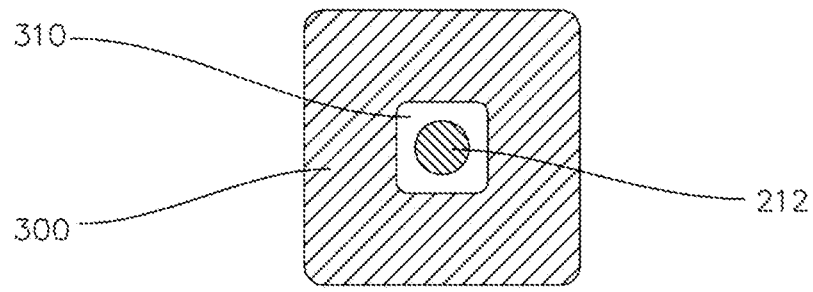
FIG. 4 is a top view of a movable frame at a position of a circular cross-sectional segment according to the present disclosure.
Figure 5:
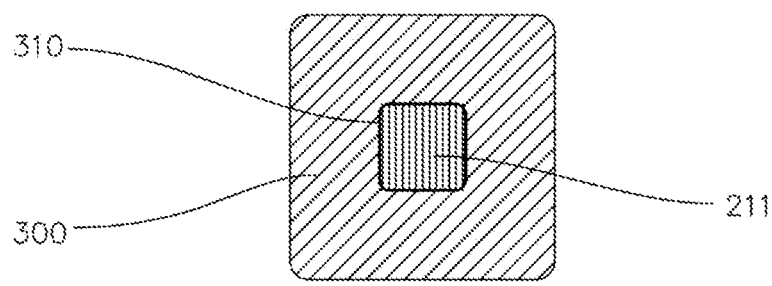
FIG. 5 is a top view of a movable frame at a position of a noncircular cross-sectional segment according to the present disclosure.
Figure 6:
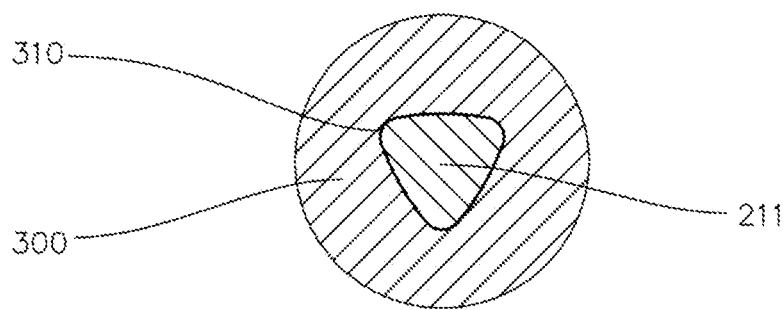
FIG. 6 is a top view of another embodiment of a movable frame at a position of the noncircular cross-sectional segment according to the present disclosure.

In some embodiments, referring to FIG. 4, FIG. 5, and FIG. 6, the movable frame 300 is provided with a noncircular hole 310. Referring to FIG. 5 and FIG. 6, the stirring rod 210 includes a noncircular cross-sectional segment 211. The noncircular hole 310 of the movable frame 300 corresponds in shape and size to the noncircular cross-sectional segment 211 of the stirring rod 210. The movable frame 300 is sleeved over the stirring rod 210 through the noncircular hole 310. Referring to FIG. 1, when the movable frame 300 moves to a position of the noncircular cross-sectional segment 211 of the stirring rod 210, the stirring rod 210 rotates to drive the movable frame 300 to rotate, and then drive the cleaning device 400 to rotate, making it more convenient for the cleaning device 400 to perform cleaning operation.

In this embodiment, optionally, referring to FIG. 4 and FIG. 5, the noncircular hole 310 is a square hole, and the noncircular cross-sectional segment 211 has a square shape.

In this embodiment, optionally, referring to FIG. 6, the noncircular hole 310 is a Reuleaux triangle hole, and the noncircular cross-sectional segment 211 has a Reuleaux triangle form.

In some embodiments, referring to FIG. 4, the stirring rod 210 includes a circular cross-sectional segment 212. Referring to FIG. 3, when the movable frame 300 moves to a position of the circular cross-sectional segment 212 of the stirring rod 210, the movable frame 300 does not affect the rotation of the stirring rod 210. That is, when the stirring rod 210 rotates, the cleaning device 400 does not rotate along, making it convenient for the cleaning device 400 to enter a concealed state when the cleaning device 400 does not need to operate.

In this embodiment, optionally, the circular cross-sectional segment 212 is located on an upper side of the stirring rod 210, and the noncircular cross-sectional segment 211 is located on the lower side of the stirring rod 210.

In some embodiments, a sleeve 700 is disposed on the stirring rod 210, and the sleeve 700 is rotatable relative to the stirring rod 210. In this way, it can be ensured that when the stirring rod 210 rotates, there is no direct friction between the stirring rod 210 and nearby components that do not rotate, and the stirring rod 210 is not affected by the nearby components.

Figure 7:
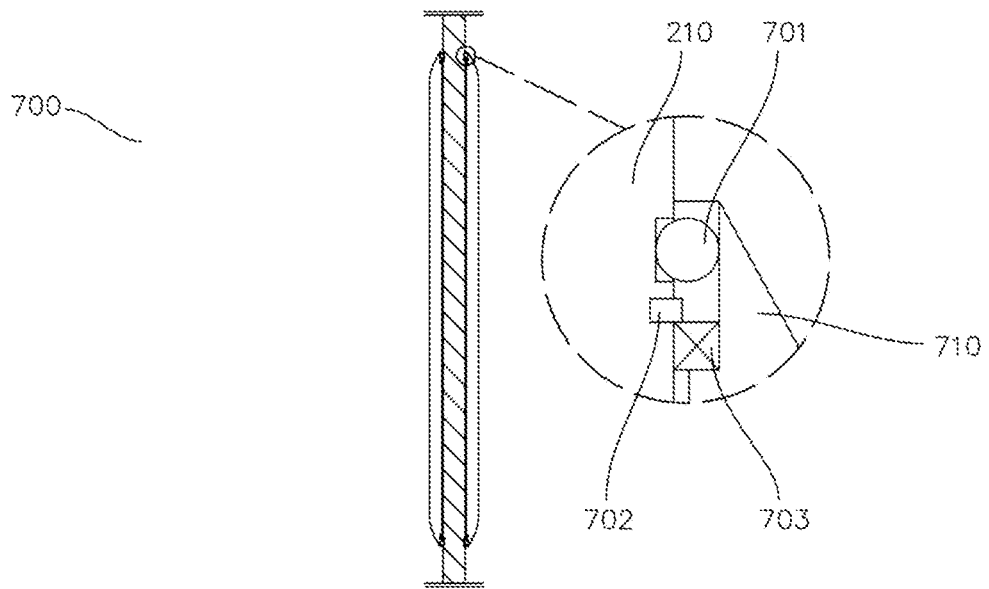
FIG. 7 is a schematic structural diagram of a sleeve (a stationary position sleeve) according to the present disclosure.
Figure 8:
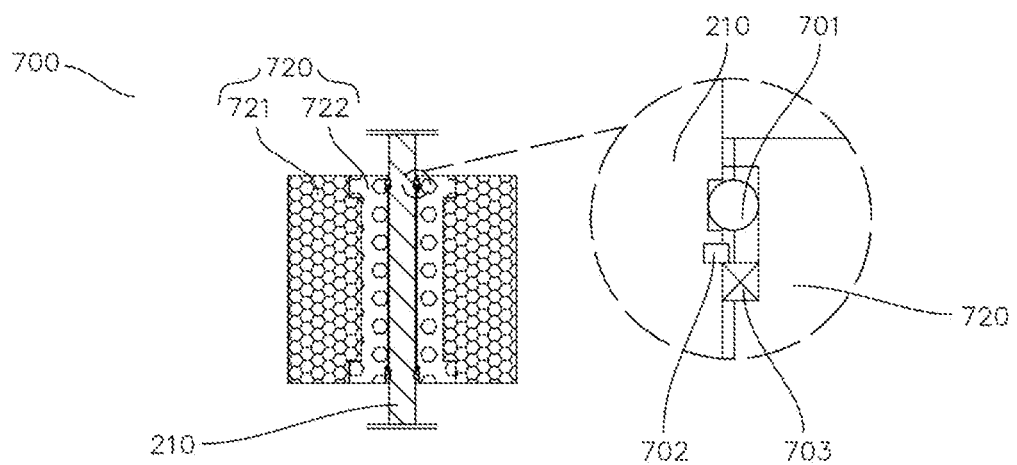
FIG. 8 is a schematic structural diagram of a sleeve (a cover seal sleeve) according to the present disclosure.

In some embodiments, referring to FIG. 7 and FIG. 8, a seal ring 701 is disposed between the sleeve 700 and the stirring rod 210, to prevent impurities from entering a gap between the sleeve 700 and the stirring rod 210, thereby avoiding affecting the operation and service life of the sleeve 700 and the stirring rod 210.

In some embodiments, a circlip 702 is disposed between the sleeve 700 and the stirring rod 210 and is configured to fix the sleeve 700 without affecting the rotation of the sleeve 700 relative to the stirring rod 210, so as to prevent the sleeve 700 from displacement in a length extending direction of the stirring rod 210.

In some embodiments, a bearing 703 is disposed between the sleeve 700 and the stirring rod 210, to ensure that the sleeve 700 can smoothly rotate relative to the stirring rod 210.

In some embodiments, the cleaning device 400 includes a scraping plate configured to scrape off dirt inside the reaction kettle.

In some embodiments, a telescopic apparatus 500 is disposed between the movable frame 300 and the cleaning device 400, and is configured to control the cleaning device 400 to extend or retract. Referring to FIG. 1, when the cleaning device 400 needs to operate, the telescopic apparatus 500 controls the cleaning device 400 to extend to the inner wall of the kettle body 100 to perform cleaning. Referring to FIG. 2, after the cleaning is completed, the telescopic apparatus 500 controls the cleaning device 400 to retract into a retracted state. In this way, it is convenient to fold the cleaning device 400, and it is easy to adjust a position of the cleaning device 400 according to the shape of the kettle body 100.

In this embodiment, optionally, the telescopic apparatus 500 controls the cleaning device 400 to make a translation in a horizontal direction.

In some embodiments, the telescopic apparatus 500 is a scissors-type telescopic structure 510, to enable the cleaning device 400 to extend or retract more stably.

In some embodiments, the telescopic apparatus 500 has a piston cylinder structure, to enable the cleaning device 400 to extend or retract more rapidly.

In some embodiments, the movable control apparatus 600 includes a rope winder 610 and a sling 620. The sling 620 is connected to the rope winder 610 and the movable frame 300. The rope winder 610 is used to control the sling 620 to retract and extend, to further control the movable frame 300 to move. Such a structure is simple and easy to use, and is suitable for operating in a sealed environment with a narrow space inside the reaction kettle.

In some embodiments, the kettle body 100 includes a concealed seal cavity 110 and a stirring cavity 120. The stirring portion 220 operates inside the stirring cavity 120. The concealed seal cavity 110 is configured to store the cleaning device 400 that does not need to operate. That is, when the cleaning device 400 moves to the concealed seal cavity 110, the cleaning device 400 enters the concealed state.

In this embodiment, optionally, the concealed seal cavity 110 is located on an upper side of the kettle body 100, and the stirring cavity 120 is located on a lower side of the kettle body 100.

In some embodiments, the concealed seal cavity 110 is provided with a maintenance window and a maintenance plate 111. When the cleaning device 400 is in the concealed state and it is necessary to examine and maintain the cleaning device 400, the maintenance plate 111 may be opened to allow a worker to examine and maintain the cleaning device 400 through the maintenance window, without having to disassemble the movable frame 300 or the cleaning device 400.

In this embodiment, optionally, the maintenance window is located on a left side or a right side of the concealed seal cavity 110.

In some embodiments, a water inlet pipe 121, a water discharge pipe 122, and a water discharge pump 123 are disposed on the stirring cavity 120. Water is fed into the stirring cavity 120 through the water inlet pipe 121, and the water discharge pipe 122 cooperates with the water discharge pump 123 to discharge water.

During operation, referring to FIG. 1, after the movable frame 300 drives the cleaning device 400 to lower to the stirring cavity 120 of the kettle body 100, the telescopic apparatus 500 controls the cleaning device 400 to extend into and press the inner wall of the kettle body 100, the stirring motor controls the stirring rod 210 to rotate and drives the cleaning device 400 to rotate together, and the water inlet pipe 121 and the water discharge pump 123 are both opened to feed in and discharge water, to cooperate with the cleaning device 400 to clean the inner wall of the kettle body 100. Referring to FIG. 2, waste water from cleaning is discharged from the kettle body 100 of the reaction kettle through the water discharge pipe 122. After the cleaning is completed, the stirring motor is turned off, and the telescopic apparatus 500 controls the cleaning device 400 to retract. Referring to FIG. 3, the movable control apparatus 600 controls the movable frame 300 to rise, and the cleaning device 400 may remain above the stirring rod 210, that is, inside the concealed seal cavity 110.

In some embodiments, referring to FIG. 2 and FIG. 7, the sleeve 700 includes a stationary position sleeve 710. In this way, when the cleaning device 400 needs to be concealed, the movable frame 300 may move to a position of the stirring rod 210 of the stationary position sleeve 710. In this way, when the cleaning device 400 is in the concealed state, the movable frame 300 does not affect the rotation of the stirring rod 210.

In this embodiment, optionally, the stationary position sleeve 710 is sleeved over a position of a part of the stirring rod 210 located in the concealed seal cavity 110.

In some embodiments, seal cavity covers 800 are disposed between the concealed seal cavity 110 and the stirring cavity 120, and are configured to close a position between the concealed seal cavity 110 and the stirring cavity 120.

In this embodiment, optionally, the movement of the seal cavity covers 800 is controlled by a cover control apparatus 810.

In this embodiment, optionally, the cover control apparatus 810 is a cylinder.

In some embodiments, referring to FIG. 3 and FIG. 8, the sleeve 700 includes a cover seal sleeve 720. When the seal cavity covers 800 are closed, the seal cavity covers 800 may abut against the cover seal sleeve 720, so that the stirring rod 210 can pass through the closed seal cavity covers 800, and at the same time the seal cavity covers 800 do not affect the rotation of the stirring rod 210.

In this embodiment, optionally, seal cavity covers 800 are separately arranged on a left side and a right side. A concave is formed between the seal cavity covers 800 to correspond to a position of the cover seal sleeve 720.

In this embodiment, optionally, the cover seal sleeve 720 includes a support sleeve 721 and a seal sleeve 722. The seal sleeve 722 is located on an outer side, and when being closed, the seal cavity covers 800 are attached to the seal sleeve 722 to ensure a sealing effect. The support sleeve 721 is located on an inner side and is used as a support structure for the cover seal sleeve 720.

In this embodiment, optionally, the support sleeve 721 is made of rigid plastic, and the seal sleeve 722 is made of soft plastic having an adequate sealing effect.

According to the foregoing principle, in the present disclosure, appropriate variations and modifications may be made to the foregoing embodiments. Therefore, the present disclosure is not limited to the specific embodiments disclosed and described above, and some modifications and variations to the present disclosure shall all fall within the protection scope of the claims of the present disclosure.

The invention claimed is:

1. A reaction kettle cleaning apparatus, comprising a kettle body (100) and a stirrer (200), the stirrer (200) being located in the kettle body (100) and comprising a stirring rod (210) and a stirring portion (220), wherein:

the kettle body (100) comprises a concealed seal cavity (110) and a stirring cavity (120), seal cavity covers (800) are disposed between the concealed seal cavity (110) and the stirring cavity (120), the stirring portion (220) operates inside the stirring cavity (120);

a movable frame (300) is disposed on the stirring rod (210) and is movable along the stirring rod (210);

a cleaning device (400) is disposed on the movable frame (300) and is configured to clean the kettle body (100); and the reaction kettle cleaning apparatus further comprises a movable control apparatus (600) configured to control the movable frame (300) to move, and the movable control apparatus (600) comprises a rope winder (610) and a sling (620);

the movable frame (300) is provided with a noncircular hole (310), and the stirring rod (210) comprises a noncircular cross-sectional segment (211);

the stirring rod (210) comprises a circular cross-sectional segment (212);

the circular cross-sectional segment (212) is located on an upper side of the stirring rod (210), and the noncircular cross-sectional segment (211) is located on the lower side of the stirring rod (210);

the noncircular hole (310) of the movable frame (300) corresponds in shape and size to the noncircular cross-sectional segment (211) of the stirring rod (210), and the movable frame (300) is sleeved over the stirring rod (210) through the noncircular hole (310);

when the movable frame (300) moves to a position of the circular cross-sectional segment (212) of the stirring rod (210), the movable frame (300) does not affect the rotation of the stirring rod (210), that is, when the stirring rod (210) rotates, the cleaning device (400) does not rotate along, making it convenient for the cleaning device (400) to move to the concealed seal cavity (110) and enter a concealed state when the cleaning device (400) does not need to operate; and when the movable frame (300) moves to a position of the noncircular cross-sectional segment (211) of the stirring rod (210), the stirring rod (210) rotates to drive the movable frame (300) to rotate, and then drive the cleaning device (400) to rotate, making it more convenient for the cleaning device (400) to perform cleaning operation.

2. The reaction kettle cleaning apparatus according to claim 1, wherein a sleeve (700) is disposed on the stirring rod (210) and is rotatable relative to the stirring rod (210).

3. The reaction kettle cleaning apparatus according to claim 2, wherein a seal ring (701) is disposed between the sleeve (700) and the stirring rod (210).

4. The reaction kettle cleaning apparatus according to claim 1, wherein a telescopic apparatus (500) is disposed between the movable frame (300) and the cleaning device (400).

5. The reaction kettle cleaning apparatus according to claim 4, wherein the telescopic apparatus (500) is a scissors-type telescopic structure (510).

* * * * *